C. F. LITTLEJOHN.
FARE REGISTER.
APPLICATION FILED NOV. 5, 1909.

1,010,279.

Patented Nov. 28, 1911.
8 SHEETS—SHEET 1.

Witnesses

Inventor
Charles F. Littlejohn.
By C. A. Snow & Co.
Attorneys

C. F. LITTLEJOHN.
FARE REGISTER.
APPLICATION FILED NOV. 5, 1909.

1,010,279.

Patented Nov. 28, 1911.

Witnesses
E. H. Stewart
F. T. Chapman

Inventor
Charles F. Littlejohn.
By C. A. Snow & Co.
Attorneys

C. F. LITTLEJOHN.
FARE REGISTER.
APPLICATION FILED NOV. 5, 1909.

1,010,279.

Patented Nov. 28, 1911.
8 SHEETS—SHEET 4.

C. F. LITTLEJOHN.
FARE REGISTER.
APPLICATION FILED NOV. 5, 1909.

1,010,279.

Patented Nov. 28, 1911.
8 SHEETS—SHEET 5.

Witnesses

Inventor
Charles F. Littlejohn
By C. A. Snow & Co.
Attorneys

C. F. LITTLEJOHN.
FARE REGISTER.
APPLICATION FILED NOV. 5, 1909.

1,010,279.

Patented Nov. 28, 1911.
8 SHEETS—SHEET 6.

Witnesses

Inventor
Charles F. Littlejohn,
By C. A. Snow & Co.
Attorneys

UNITED STATES PATENT OFFICE.

CHARLES F. LITTLEJOHN, OF NEW HAVEN, CONNECTICUT.

FARE-REGISTER.

1,010,279.      Specification of Letters Patent.      Patented Nov. 28, 1911.

Application filed November 5, 1909. Serial No. 526,448.

*To all whom it may concern:*

Be it known that I, CHARLES F. LITTLEJOHN, a citizen of the United States, residing at New Haven, in the county of New Haven and State of Connecticut, have invented a new and useful Fare-Register, of which the following is a specification.

This invention has reference to improvements in fare registers and its object is to provide an improved machine for this or any other counting purpose, which machine is simple in construction and positive in action and furthermore will prevent over-registration or dishonest manipulation.

The present invention includes many novel features useful in connection with machines of the character to which the invention relates, provision being made in the structure included in the present invention for operating the register from either side of the car, but the construction is such that the mechanism in active operation locks the operating mechanism operable from the other side of the car. Furthermore provision is made for increasing the power of this portion of the mechanism and for slowing down its speed of movement from the zero to the maximum position so that the several parts of the registering mechanism may operate in proper timed sequence.

The invention also includes a main registering train and a totalizing registering train as is customary in structures of this character and while the totalizing train may be largely of the ordinary construction there are certain features of novelty entering therein. The main registering train contains many features of novelty and the operating mechanism therefor directly co-acting therewith is novel in many respects.

The present invention includes a special resetting mechanism so constructed as to operate the direction indicating part as the main registering train is brought to the zero position and to further permit the operation of the direction indicating part after the main registering train has been brought to the zero position.

Provision is made in the structure of the present invention for locking the registering mechanism against movement except in the registering direction after having once been started even to a very small extent so that the registering mechanism must be actuated to the full extent of its active travel before it can be returned to the initial position. This part of the invention prevents manipulation of the register so that it will record falsely and prevents the general improper operation of the device.

These several features of the invention as well as other features will be best understood from a consideration of the following detail description taken in connection with the accompanying drawings forming a part of this specification, with the understanding however that while the drawings show the invention in commercial form, it is not limited to the showing of the drawings, but the constructions may be varied in many particulars while retaining the salient features of the invention.

Referring to the drawings.

Referring to the drawings there is shown a basic or back member 1 of generally plane circular form with a peripheral flaring flange 2 against which rests a plate 3 forming a support for the major portion of the operating mechanism of the register and coacting with the member 1 to inclose a chamber 4 in which is housed a portion of the operating mechanism.

Formed on the basic member 1 so as to project above the plane of the edge of the flange 2 is a lug 5 designed to enter and lock in an appropriately formed eye 6 projecting from the plate 3 at the proper point.

Formed on the basic member 1 at a point diametrically opposite from the lug 5 is a projection 7 having a surface in the plane of the outer edge of the flange 2 and on this surface there is formed a boss 8 of generally rectangular shape adapted to enter a similarly shaped opening 9 in a projection 10 from the plate 3 at a point thereon diametrically opposite from the eye 6.

On the boss 8 near one corner thereof is a stud 11 on which is mounted an angle plate 12 at one corner of the latter, this angle plate extending beyond one side of the boss 8 and is provided with an outstanding ear 13. The projection 10 has its opening 9 provided with an offset 14 of a size to permit the passage of the projecting portion of the angle plate 12, the projection 10 being provided with an inclined shoulder 15 in a position to engage the angle plate 12 so as to swing it on its pivot into coincidence with the off-set 14 while a spring 16 between a projecting member 17 of the angle plate, and the boss 8 tends to move the angle plate over the shoulder and against an outwardly projecting ear 18 on the corresponding face of the member 10.

The ears 13 and 18 when the boss 8 is in position in the opening 9 are brought together and a suitable lock 19 or any other suitable fastening means may be employed to secure these ears together against accidental or unauthorized separation.

The structure described forms a simple and efficient means for securing the plate 3 and parts carried thereby to the base 1, but this does not preclude the use of other fastening means if such be desirable.

The base 1 is provided at suitable points with perforations 20 by means of which it may be secured by screws or other fastening devices to a suitable support such, for instance, as an appropriate part of a car body.

The base 1 carries on its inner face at appropriate points spaced pins or studs 21 each forming a pivot support for an angle lever 22, there being two such angle levers housed within the chamber 4 and having appropriately bent ends 23 extending through slots 24 in the flange 2 on opposite sides of a center line diametric to the base and central to the lug 5 and projection 7. At the outer end of each lever 22 beyond the flange 2 there is provided a stud 25 or other appropriate means for the attachment of operating devices designed to extend along the sides of the car within reach of the conductor. Those ends of the levers 22 which extend through these slots 24 have formed on them within the chamber 4 studs 26 to which the opposite ends of a spring 27 are secured, this spring tending to maintain the levers 22 with the ends projecting through the slots 24 at the adjacent ends of these slots.

At the angles of the levers 22 each lever is provided with a lug 28 having its outer edge curved on an arc struck from the center of the respective stud 21 and at one corner each lug is cut away as indicated at 29 to permit the lug of the other lever to move by it with the curved end adjacent to this cut-away portion, the lugs being so related that the center lines of the lugs radial to the axes of the levers, would, if continued, intersect.

When in normal position those ends of the levers 22 which are connected by the spring 27 are in substantially parallel relation and the other ends of these levers diverge one from the other, being normally, at their outer ends, in engagement with respective lugs or stops 30 formed on the inner face of the base 1. The outer ends of the diverging arms of the levers 22 are connected each to a respective link 31 by means of a pin 32 which may be formed on the corresponding end of the link 31 while the other ends of the two links 31 are joined together and to one end of another link 33 by a stud 34 which may be in the form of a screw stud secured to one of the links 31. One of the said links 31 has in its path a lug 35 formed on the base 1 so that when the levers 22 are in engagement with the lugs 30, the links 31 and 33 are prevented from moving in one direction by the lug 35 with which one of the links engages, these three links being all connected together by the stud 34.

That end of the link 33 remote from the end connected to the link 31 is formed into a laterally extending head 36 axially through which there is formed a passage 37. One end of the head 36 is expanded and is conical at the sides to engage between undercut or beveled flanges 38 secured to the base 1 at an appropriate point in parallel spaced relation.

If a suitable force be applied to the exposed end of one of the levers 22 to move the lever about its pivot stud 21 then the curved end of the lug 28 carried by the said lever will engage the cut-away portion 29 of the corresponding lug of the other lever, thus locking the second lever against movement under a force applied to the exposed end of the second lever. Movement of the second lever to carry the end within the chamber 4 away from the first lever is prevented by the corresponding stud 30. It will be observed that the links 31 are out of alinement with their joined ends more remote from the plane of the axes of the studs 21 than are the pivot connections of these links with the corresponding ends of the levers 22. The result is that the link 31 connected to the fixed lever and the link 33 become toggle links to the junction point of which the link 31 connected to the moving lever is joined. The resulting motion forces the head 36 in a direction away from the levers 22 and in a line radial to the center of the base 1, this line of travel being determined by the flange members 38.

Figures 7, 14, 15:
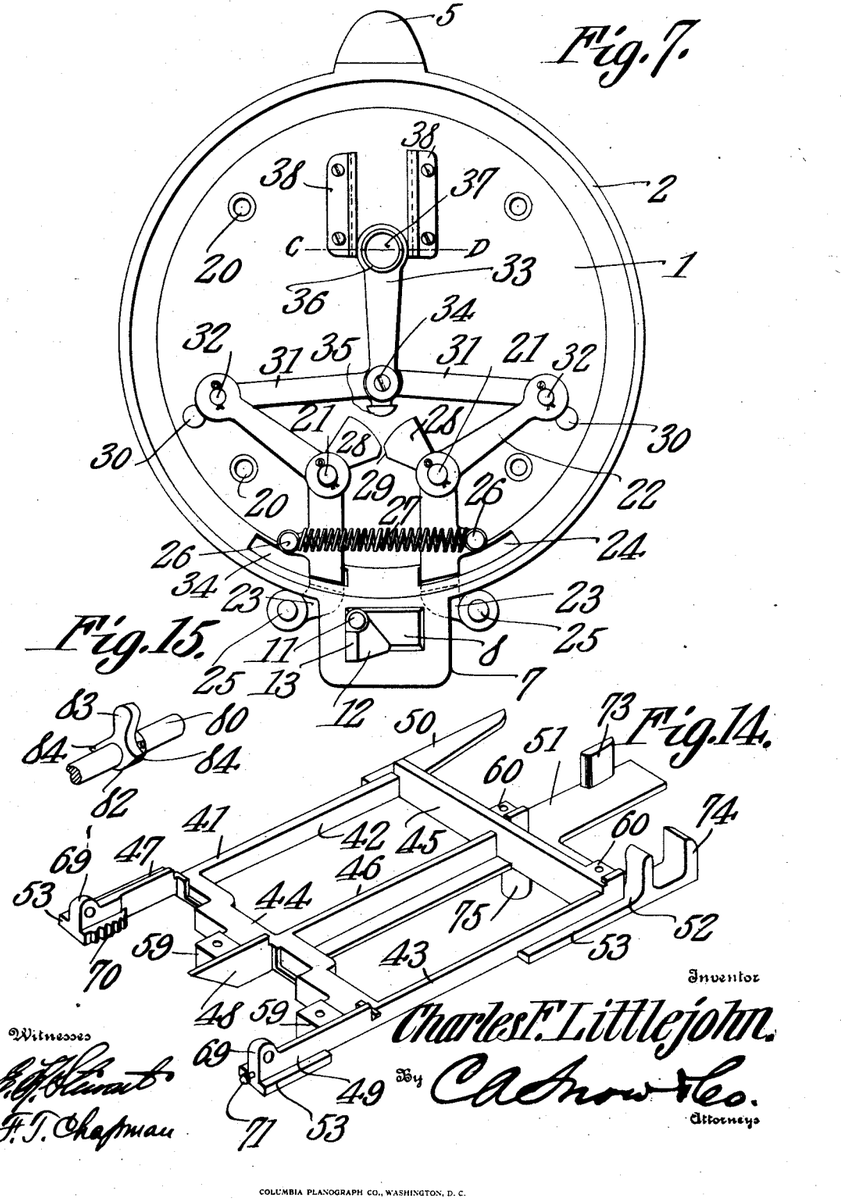
Fig. 7 is an elevation of the back plate and parts immediately carried thereby.
Fig. 14 is a perspective view of the main sliding frame for actuating the main and totalizing trains.
Fig. 15 is a perspective view of a portion of the manipulating mechanism for the resetting slide.
Figure 10:
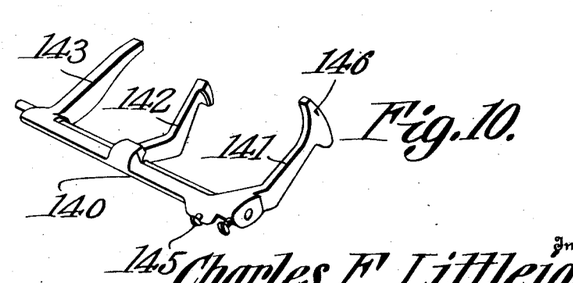
Fig. 10 is a perspective view of the triple pawl used in connection with the main registering train.

Because of the toggle action of the links 31 and 33 the amount of power necessary to cause the movement of the head 36 becomes progressively less because of the approach toward the alining position of the links 31 and 33. When the actuating force applied to the exposed end of the active lever 22 is removed the spring 27 returns the parts to the initial position, which position is best shown in Fig. 7. The same action results when the other lever 22 becomes the active lever, the head 36 traversing the same path as before. While the levers 22 are shown as connected by the spring 27, the latter may be otherwise disposed so long as the levers and the parts acted on by them are returned to the normal or inactive position.

The structure shown in Fig. 7, with the exception of the exposed ends of the levers 22, is housed in the basic portion of the register and is only accessible when the plate 3 and the parts carried thereby are removed from the basic portion of the device.

The face of the plate 3 remote from the chamber 4 is provided with parallel guides 39 spaced apart and located on opposite sides of a center line diametric to the plate 3 and traversing the members 6 and 10. The facing edges of the guides are parallel one to the other while the other edges may have off-sets 40 for a purpose which will presently appear.

Figures 6, 13, 25:
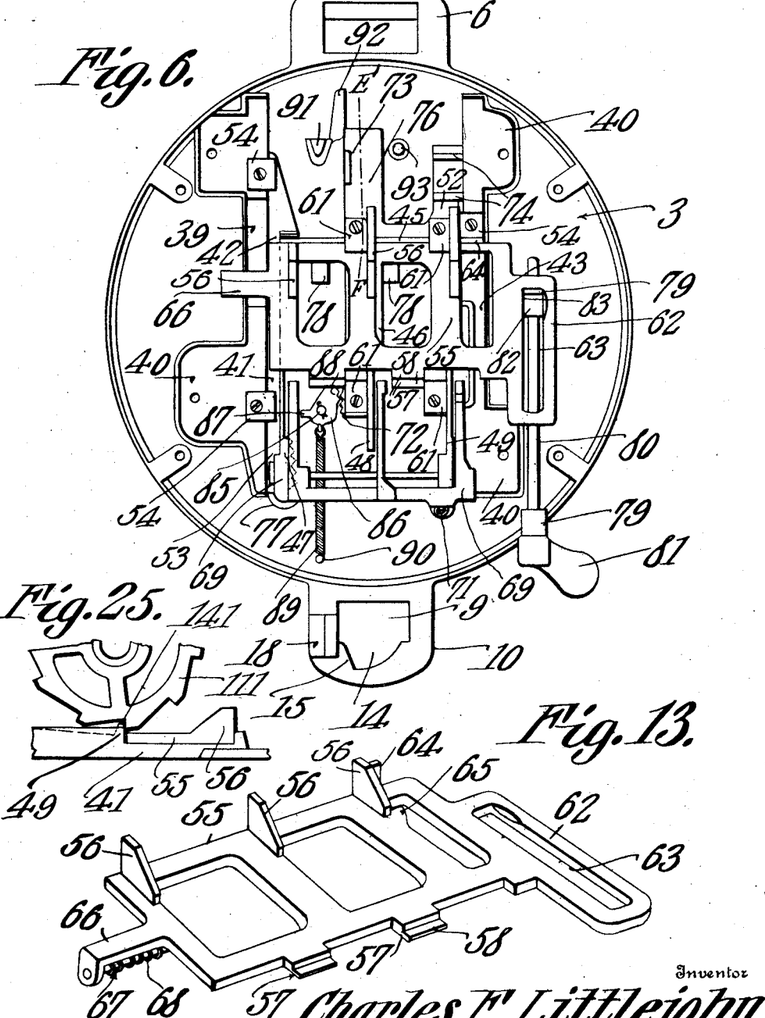
Fig. 6 is an elevation of the working parts of the registering train with the supporting frame therefor and parts carried by such supporting frame removed, the signal mechanism being also omitted.
Fig. 13 is a perspective view of the resetting frame.
Figs. 23, 24 and 25 show different phases of operation of the main registering train.

The guides are for the purpose of defining the direction of travel of a frame or slide 41 best shown in Figs. 6 and 14 and also in part shown in other figures. The frame 41 is the main operating slide for the main and totalizing trains of the register, which trains are hereinafter described. For the sake of lightness the frame 41 is made of skeleton type and generally is composed of two side bars 42, 43, end bars 44, 45, and a central connecting bar or web 46 parallel with and between the bars 42 and 43. The bottoms of the several bars may be all in one plane and move on the corresponding face of the plate 3, being held against movement by the guides 39 except in the direction of the length of the latter. Beyond the end 44 of the frame are continuations 47, 48, 49 in line with the side and center bars and beyond the end 45 are continuations 50, 51, 52 also in line with the side bars 42 and 43 and the center bar 46. At the outer faces of the extensions 47 and 49 and also at the outer edge of the sides 43 are longitudinal flanges 53, while the extension 50 projects laterally beyond the outer face of the side bar 42 of the frame and is of the same thickness as the flanges 53, which latter are of less thickness than the height of the side bars 42, 43, and the extensions thereof. The flanges 53 and the extension 50 are of substantially the same height as the guides 39 and small guide plates 54 are secured to the guides 39 at appropriate points to engage the extension 50 and the flanges 53 the plates 54 thus serving to hold the slide 41 to the plate 3 without the interference of the movement of the plate along the guides 39. Of course other means may be provided for holding the slide 41 in the path through which it is movable and the means shown are to be taken simply as illustrative.

Since the movement of the slide 41 is of limited extent the guides 39 and the flanges 53 need not be more extensive than the movement of the slide. The tops of the side members 42 and 43 and the central connection member 46 are all in the same plane while the end member 45 and the continuations 47, 48 and 49 project above this plane thus forming guides for another slidable frame 55 shown separately in Fig. 13. This last named frame is of skeleton construction for lightness and cheapness of manufacture and is longer than the width of the slide or frame 41, its width being sufficient to extend between the end members 44 and 45 of the said slide 41. That side of the frame 55 engaging the end member 45 of the slide 41 is provided with upstanding lugs 56 equal in number to and spaced correspondingly with the extensions 47, 48 and 49 of the slide 41. Those portions of the extensions 47, 48 and 49 adjacent to the end 44 project in the general plane of the upper part of the slide 41 at nearly right angles thereto. Between these upstanding members 47, 48 and 49 the frame 55 is provided with lugs 57 thinned at their outer ends as indicated at 58. The extensions 48 and 49 and the adjacent portions of the end bar 44 have bosses 59 formed thereon and the extensions 51 and 52 and the end bar 45 where joining them have bosses 60 formed thereon. These bosses are for the reception of plates 61 overriding the corresponding portions of the frame 55 and the thinned portions 58 of the lugs 57 respectively and thereby holding the frame 55 to the slide 41 in such manner that the frame 55 may be moved across the slide 41 at right angles to the direction of movement of the latter.

The frame 55 at one end is provided with a lateral extension 62 having a slot 63 longitudinal thereto, and is also formed with lugs 64 and 65 the purpose of which will appear hereinafter. The frame 55 is furthermore provided at the end remote from the extension 62 with a bracket 66 having a downward extension carrying a guide pin 67 projecting toward the frame and on this pin there is a spring 68 designed to engage the side bar 42 of the slide 41 at an appropriate point. The spring 68 tends to maintain the frame 55 at one limit of its movement and is put under compression when the frame 55 is moved toward the other limit of its travel.

The extensions 47 and 49 of the slide 41 are provided at their extremities with upstanding ears 69 for a purpose which will presently appear and the extension 47 is formed on its inner edge with a series of ratchet teeth 70. The extension 49 is provided at its outer end with a pin 71. On the inner side of the boss 59 adjacent to the extension 48 are ratchet teeth 72. The extension 51 of the slide 41 has formed thereon an upstanding lug 73 in the shape of a wedge or cam, and the extension 52 has a pair of spaced upstanding parallel lugs 74 formed thereon.

Formed on the lower side of the slide 41 at a point about coincident with the junction of the extension 51 and end piece 45 is a pin or stud 75 which, when the slide is in place extends through a slot 76 in the plate 3 and into the chamber 4 where it enters the passage 37 in the head 36. The purpose of the several parts of the slide 41 and frame 55 will appear hereinafter.

The action of the spring 27 on the levers 22 is to maintain the links 33 at one limit of its travel and the action of this spring is transmitted through the stud 75 to the slide 41 thus tending to maintain it at one limit of its travel where it abuts against stops 77 formed on the face of the plate 3 near one end of the guides 39. The other limit of travel of the slide 41 is determined by stops 78 formed on the corresponding face of the plate 3 in the path of the end member 44 of the slide 41.

Formed on the plate 3 are lugs 79 in which is journaled a shaft 80 extending at one end beyond the edge of the plate 3 where it carries a manipulating member 81 shown in the drawings in the form of a single-wing head, but of course this manipulating member may be otherwise formed than shown. The shaft 80 is so positioned that in the normal or inactive position of the parts it underrides the slot 63 in the lateral extension 62 of the frame 55. The shaft 80 carries a hub 82 made fast to the shaft in any suitable manner and this hub is formed with a radial finger 83 extending into the slot 63 in the extension 62 and is there rounded so that by rocking the shaft 80 on its longitudinal axis the finger 83 will be rocked in a direction to move the frame 55 laterally to the slide 41 against the action of the spring 68 and to the full extent of its travel in the direction across the slide 41. The extent of rotative movement of the shaft 80 may be limited by stops 84 projecting from opposite sides of the hub 82 and engaging the face of the plate 3. Under the normal condition of the parts the finger 83 is near one end of the slot 63 and this slot is of sufficient length to permit the frame 55 to participate in the movement of the slide 41 between the guides 39 without the finger 83 being removed from the said slot.

Projecting from the face of the plate 3 is a stud 85 at a point between the extensions 47 and 48 of the slide 41 when the latter is in its normal position, this position being shown best in Fig. 6. Mounted on the stud 85 is a block 86 having on one side a projecting finger or pawl 87 adapted to engage the ratchet teeth 70 during the longitudinal movement of the slide 41 from its position of rest toward the active position and on the return movement of the said slide and the block 86 on the side remote from the finger 87 is formed with teeth 88 adapted to the teeth 72. The pawl block 86 is under the control of a spring 89 fast at one end to the said block 86 about midway between the finger 87 and the teeth 88, and at the other end this spring is made fast to a stud 90 on the plate 3. The teeth 70 and the pawl 87 co-act to prevent return movement of the slide 41 on having been started on its active travel and before the limit of such active travel is reached, the parts being so proportioned that when this last named limit is reached the finger or clock 87 will escape from the teeth 70 and be drawn to normal position by the spring 89 so that on the return movement of the frame 41 this click will snap by the teeth 70 without interference and at the same time will act to prevent a second active movement of the frame 41 before it has been returned to its normal position. In this last named position the teeth 88 of the block 86 are in engagement with the teeth 72. The teeth 72 are so shaped and the teeth 88 are so located on the block 86 as to not interfere with the active movement of the slide 41. Because of the action of the finger 87 of the pawl block 86 in operating as a back-stop for the slide 41 in each direction of its movement there is some lost space between the finger 87 and the teeth 70 since this finger must snap by the last tooth 70 in order to be in position to ride idly over these teeth on the active movement of the frame 41. This unrestrained or unlocked movement of the slide 41 is sufficient to permit a dishonest operator to cause a partial operation of the register sufficient to cause false registration. To overcome this the teeth 88 are provided on the block 86 and the teeth 72 are provided on the slide 41, these two sets of teeth co-acting to prevent any return movement of the slide 41 after having once been started on its active movement. The teeth 88 and 72 may be comparatively small so that very little active movement of the slide 41 will cause these teeth to interlock and so prevent any return movement of said slide toward the inactive position.

Formed on the face of the plate 3 adjacent to the extension 51 of the slide 41 is a lug 91 on one side of which next to the extension 51 is a short guide 92 also formed on the plate 3. On the other side of the extension 51 remote from the guide 92 and opposite the lug 91 is a post or stem 93 receiving ears 94 on opposite ends of the block 95 formed near the ends with angularly arranged sockets 96 and 97 respectively and near one end with an angle finger 98 while near the middle this block is provided with a lug 99.

Mounted on the stem 93 between the block 95 and the face of the plate 3 is an angle lever 100 having one arm adjacent to the socket 97 on the plate 95 and also socketed so that between these two parts there is housed a spring 101 tending to maintain the lever 100 in yielding relation to the block 95. The other end of the lever 100 is in the path of the lug 73 on the extension 51 of the slide 41 and the direction of engagement of the lug 73 with the lever 100 is such as to cause the block 95 to turn about the stem 93. At the outer end of the stem 93 there is pivoted one end of an arm 102 carrying at the other end a hammer or striker head 103 designed to engage a bell 104 mounted as hereinafter described. The arm 102 is provided with a lug 105 adjacent to the socket 96 and between these two members there is lodged a spring 106 tending to maintain the arm 102 and block 95 in yielding relation.

Secured to the off-set portions 40 of the guides 39 are two frame plates 107 and 108, each of these plates being provided with appropriate legs 109 ending in feet resting on the off-sets 40 and secured thereto by screws or otherwise, the plates being in spaced parallel relation one to the other.

Figure 1:
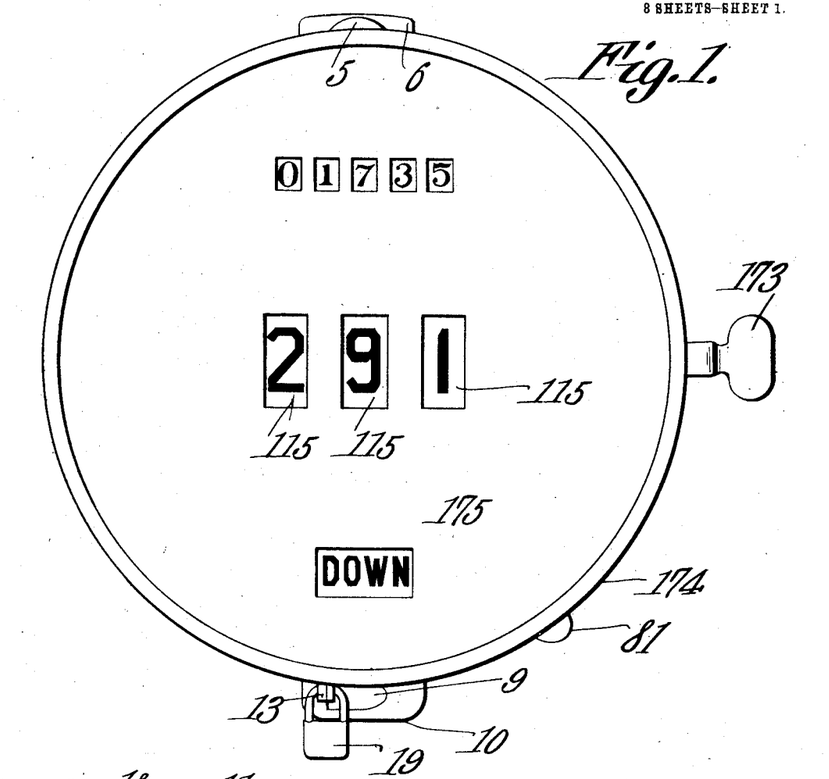
Figure 1 is a front elevation of the fare register with the casing in place.
Figures 2, 8, 9:
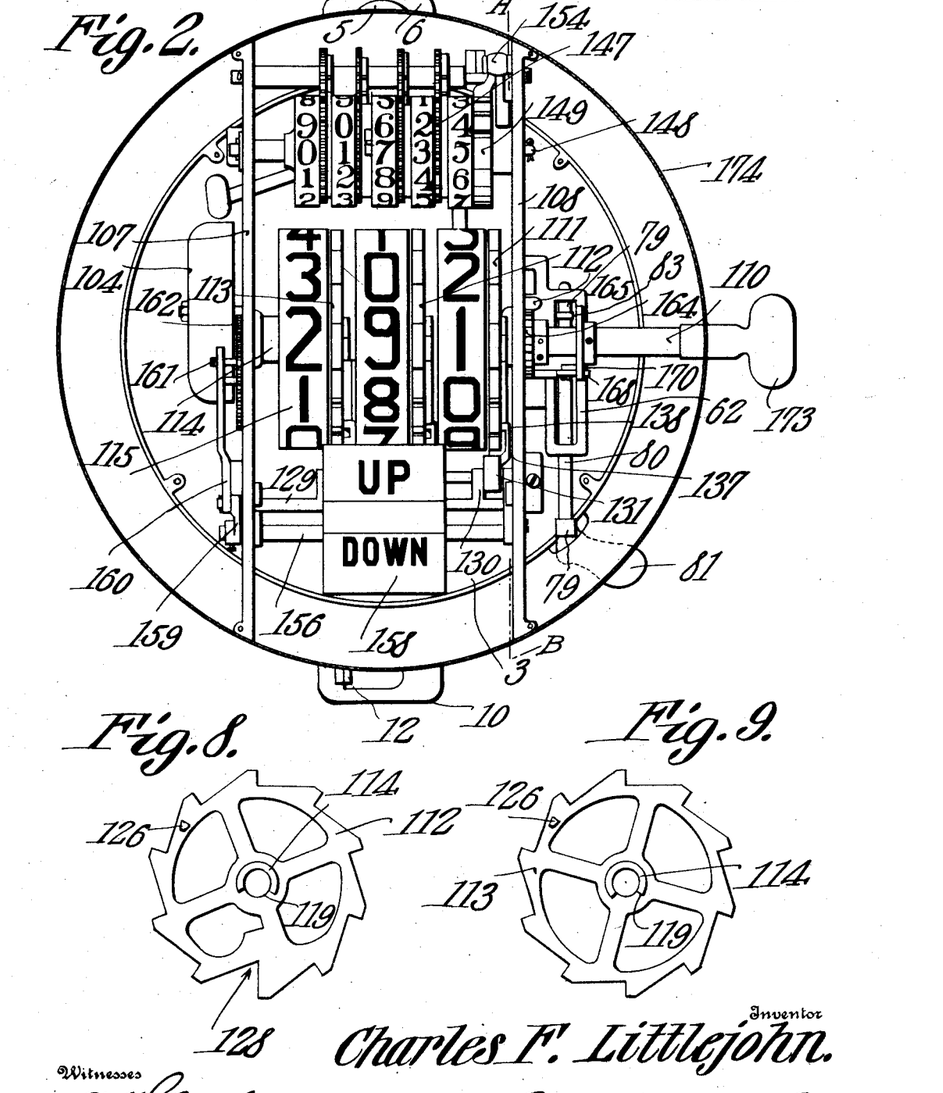
Fig. 2 is a similar view with the outer part of the casing removed to expose the operating mechanism.
Figs. 8 and 9 are detail views of ratchet wheels used in connection with the main registering train.
Figure 3:
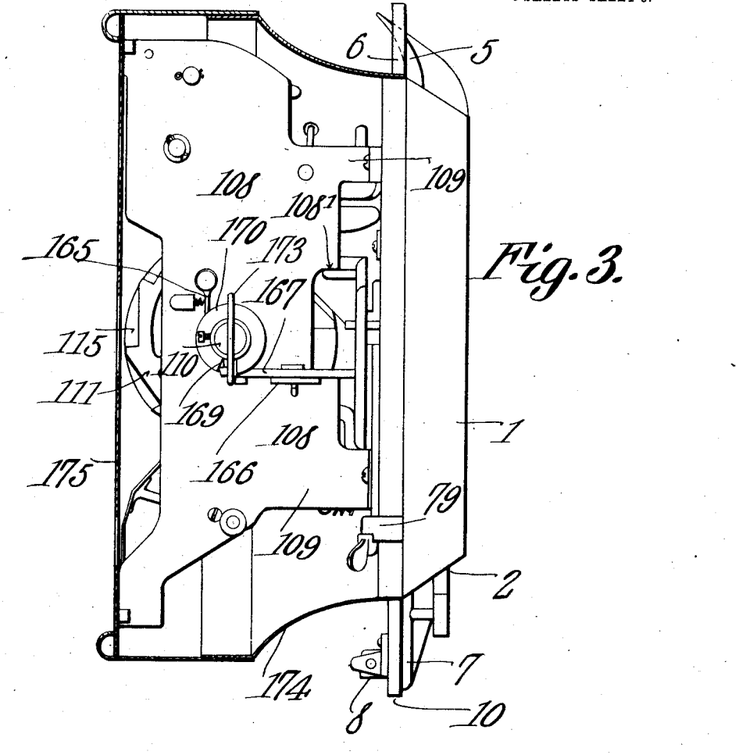
Fig. 3 is a side elevation of the structure shown in Fig. 2 with the casing in diametric section, the view being taken from the resetting side of the register.
Figure 4:
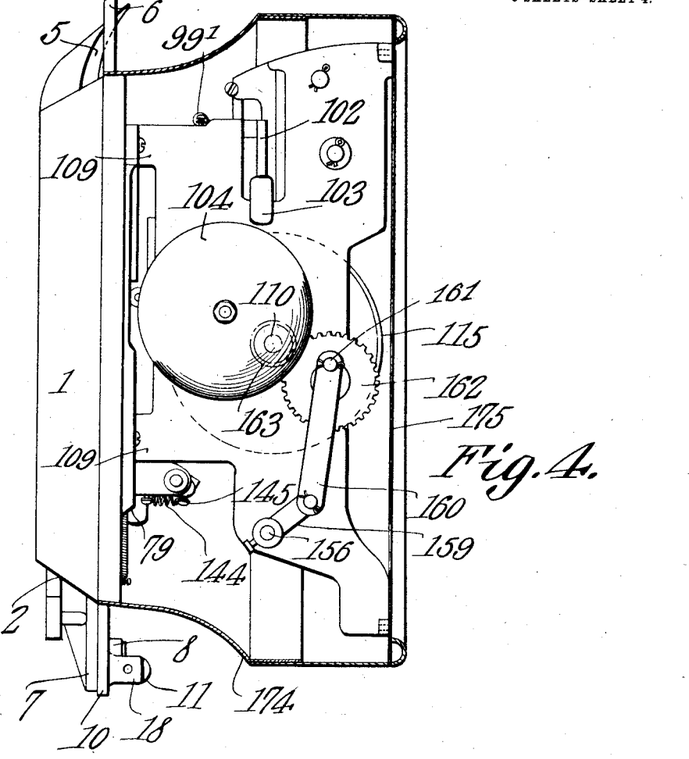
Fig. 4 is a view similar to Fig. 3 but taken from the other side of the structure.
Figure 5:
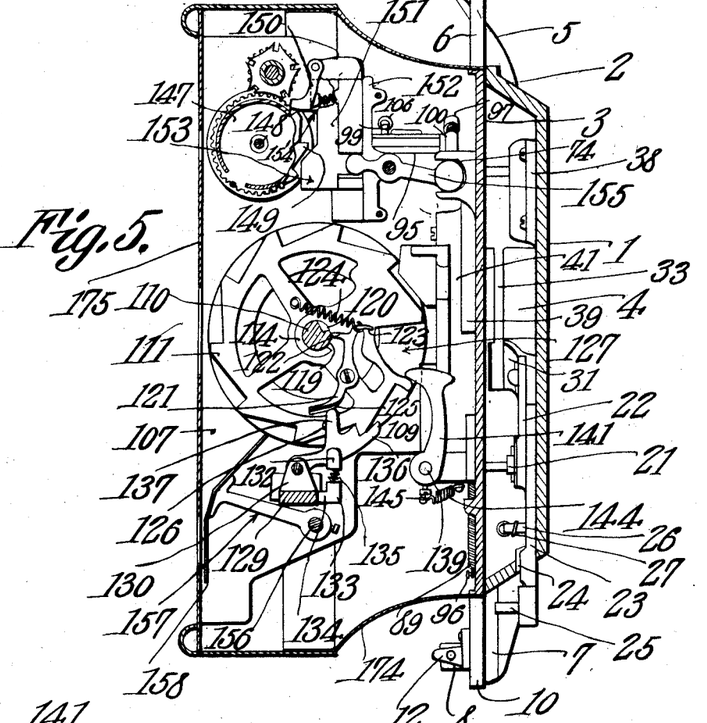
Fig. 5 is a section on the line A—B of Fig. 2 with the casing in central section.

Mounted in suitable bearings in the plates 107 and 108 about midway of their length is a shaft 110 traversing the space between the plates and extending for a considerable distance beyond the outer face of the plate 108. Mounted on the shaft 110 between the plates 107 and 108 are three ratchet wheels 111, 112, and 113 respectively. Each ratchet wheel is provided with a hub 114 extending but a short distance beyond one face of the ratchet wheel but to such a distance beyond the other face of the ratchet wheel as to operate as a spacing means between the ratchet wheels so that there is room for the attachment to each ratchet wheel of a thin metal drum 115 on which is displayed a circular series of digits from 0 to 9 each drum representing units, tens or hundreds respectively. Each drum 115 is provided on one edge with an inwardly directed annular flange 116 by means of which it may be secured to the respective ratchet wheel by screws 117 or otherwise, the corresponding face of the ratchet wheel being provided with spacing lugs 118 by means of which the number drums are spaced away a short distance from the corresponding face of the ratchet wheel carrying it so that lubricant applied to the ratchet wheel cannot readily find its way to the visible portion of the drum and obscure or mar the same. The shorter end of the hub 114 of each ratchet wheel is cut away for a portion of its circumference as indicated at 119 and the shaft 110 is formed with notches 120 increasing in depth from the periphery of the shaft toward the other end of the notch and there terminating in a radial shoulder, and these notches are coincident with the cut away portions 119 of the hubs 114, there being a notch 120 individual to the cut-away portion 119 of each hub. Pivoted to each ratchet wheel on the face thereof remote from that carrying the number drum is a lever 121 best shown in Fig. 11 and also well shown in Fig. 5. This lever has near one end a tooth 122 extending into the cut-away portion 119 of the hub 114 and adapted to move into the notch 120 in the shaft 110. Beyond the tooth 122 the lever 121 is formed with an eye 123 for receiving one end of a spring 124 fast at the other end to the ratchet wheel and tending at all times to move the lever 121 in a direction to cause the tooth 122 to enter the notch 120 correspondingly located in the shaft 110. The end of the lever 121 remote from the tooth 122 is formed with a finger 125 curved eccentrically to the axis of the lever 121 for a purpose which will presently appear, this finger 125 being located nearer to the periphery of the ratchet wheel than is the pivot support of the lever 121. The finger 125 is to operate as a cam structure being designed to engage a relatively fixed member in such manner as to move the lever 121 about its pivot and so curvature of the active portion of the finger 125 is not mandatory, but the active edge of the finger should be so related to the curved path traversed by the finger during the rotative movement of the ratchet wheel that it will pass the relatively fixed member, but in such manner as to cause a limited movement of the lever 121 about its pivot and against the action of the spring 124, the movement so caused being sufficient to lift the tooth 122 out of the notch 120 when lodged therein, this tooth otherwise riding around the shaft 110 on the surface thereof when the ratchet wheel is rotated.

Adjacent to but spaced from the finger 125 outward therefrom upon the corresponding face of the ratchet wheel is a lug substantially of prismatic form with one corner of the prism presented toward the finger 125. This prismatic form is however not mandatory. The space between two of the teeth of the ratchet wheel 111 radially related to the cut-away portion 119 of the hub 114 is deepened to form a recess 127. The ratchet wheel 112 is similarly recessed as shown at 128 except that the recess is of less radial extent. The ratchet wheel 113 has its teeth all alike.

Fast at its ends to the two plates 107 and 108 and extending between these plates adjacent to the main registering train (made up of the ratchet wheels 111, 112 and 113 with their number drums), is a bar 129 provided on one face with spaced pairs of ears 130 each pair receiving between it one end of a pawl 131 having on its rear edge a cup 132 matching and spaced from another cup 133 formed on the free end of a bracket 134 projecting from one edge of the bar 129. These cups house the ends of a spring 135 acting on the pawl 131. Each pawl 131 engages at its free end a respective ratchet wheel 111, 112, or 113 as the case may be and this free end of the pawl is formed into a nose 136 of sufficient extent to cause the pawl of the respective ratchet wheel 111 or 112 to bridge the recess 127 or 128 thus preventing it dropping thereinto.

Projecting from one side of each pawl 131 is a finger 137 extending along the face of the corresponding ratchet wheel remote from the number drum and having its free end 138 turned toward the face of the ratchet wheel so that the lug 126 may pass between this end of the finger and the body of the pawl while the finger 125 of the lever 121 will pass to the other side of the inturned end 138 of the finger 137.

When the main registering train is reset one or more lugs 126 are brought behind respective finger ends 138 and this will occur just as the pawl or pawls 131 snap behind the teeth of the ratchet wheels as they reach the zero position. The movement of the ratchet wheels is thus positively arrested at the zero position thus preventing them from moving by acquired momentum past such position and thereby blocking further active operation of the device by preventing the active movement of slide 41. At the same time the finger 125 of the lever 121 has been engaged by the end 138 of the finger 137 and forced thereby against the action of the spring 124 to a sufficient extent to remove the tooth 122 from the recess 120 in the shaft 110 and the parts are so held until a further rotative movement of the ratchet wheel carries the pawl tooth 122 onto the peripheral portion of the shaft. So long as the ratchet wheels remain in this position, which position corresponds to the zero position of the ratchet wheels the pawl lever 121 of each ratchet wheel is held in a position with the tooth 122 away from the corresponding notch 120 in the shaft 110, and the lever 121 cannot then move under the action of its spring 124 to a sufficient extent to permit the tooth 122 to drop into the notch 120 even though the latter be coincident with such notch.

Secured to the ears 69 of the slide 41 is a rod 139 upon which is mounted the body portion 140 of a triple pawl consisting of three pawls 141, 142 and 143 designed to engage and actuate at the proper time the respective ratchet wheels 111, 112 and 113. The body 140 of the triple pawl may be made fast to the rod 139 so that the two turn together. The triple pawl is under the normal control of a spring 144 made fast at one end to a stud 145 on the triple pawl and at the other end to the stud 71 on the slide 41. The tendency of the spring 144 is to maintain the outer ends of the several pawls 141, 142 and 143 toward the respective ratchet wheels.

The outer end of the pawl 141 is formed with a lateral projection 146 adapted to engage the teeth of the ratchet wheel 111 and to move into the recess 127 when coincident therewith. That edge of the projection 146 toward the body 140 of the triple pawl is concave so that the pawl will readily move out of the recess 127 when engaged by the corresponding wall thereof, while the outer face of the end 146 is rounded so that it will properly engage the unit wheel whether the triple pawl be acting on one or more ratchet wheels at a time.

The pawls 142 and 143 have their active ends at different angles of projection from the body portion of the triple pawl and the active end of the portion 146 of the pawl 141, the construction being such that so long as the pawl 141 is in engagement with the teeth of the ratchet wheel 111, the pawls 142 and 143 are out of engagement with the teeth of the respective ratchet wheels 112 and 113. When however the pawl 141 has its end 146 coincident with the recess 127 so as to move thereinto the pawl 142 moves into engagement with the teeth of the ratchet wheel 112, but the pawl 143 is still out of engagement with the teeth of the ratchet wheel 113. When however the recess 128 of the ratchet wheel 112 is brought into coincidence with the active end of the pawl 142 the latter will drop into said recess while the end 146 of the pawl 141 will move into the recess 127 to a greater extent than before so that the pawl 143 is brought into engagement with the teeth of the ratchet wheel 113 by the action of the spring 144. On each complete rotation of the ratchet wheel 111, the end 146 of the pawl 141 drops into the recess 127 and the pawl 142 is then in active engagement with the ratchet wheel 112 and, as will hereinafter appear, the ratchet wheel 112 is moved the distance of one tooth before the pawl 141 is withdrawn from the recess 127. Under these conditions the ratchet wheel 111 makes ten rotations to each rotation of the ratchet wheel 112 and the latter makes ten rotations to each rotation of the ratchet wheel 113, this being the ordinary operation of structures of this kind.

The triple pawl is carried by the slide 41 so as to travel therewith and consequently at each reciprocatory movement of the slide 41 the pawl 141 will impart to the ratchet wheel 111 a forward rotative movement equal to the length of one tooth thus moving the indicating drum fast to this ratchet wheel one space. Additional reciprocatory movements of the slide 41 causes additional progressive movement of the ratchet wheel 111 and if a sufficient number of such movements be given to the slide 41, the second and finally the third ratchet wheels will receive rotative impulses on the tenth rotation of each ratchet wheel of the lower order. In the particular structure shown in the drawings three ratchet wheels and indicating or number drums are shown, but it is apparent that a greater or less number of such indicating units may be employed as may be desired.

When the parts are in the normal or inactive position the inclined edge of a lug 56 of the frame 55 is immediately adjacent to a ratchet wheel 111, 112 or 113 as the case may be, and the relation of this lug to the respective ratchet wheel is such that the latter cannot be rotated in either direction so long as this relation is maintained.

When the main frame or slide 41 moves actively the pawl 141 causes the actuation of the unit ratchet wheel, and at the same time moving the lugs 56 away from their locking relation to the several ratchet wheels, but the ratchet wheels are prevented from moving to such an extent as to over register, or from being improperly rotated by the upstanding adjacent ends of the extensions 47, 48 and 49. This will be seen from Figs. 23, 24 and 25, which illustrate the relations of the slides 41 and 55 to the ratchet wheels, both in the inactive position of the parts and while the slide 41 is moving actively.

Figures 11, 23:
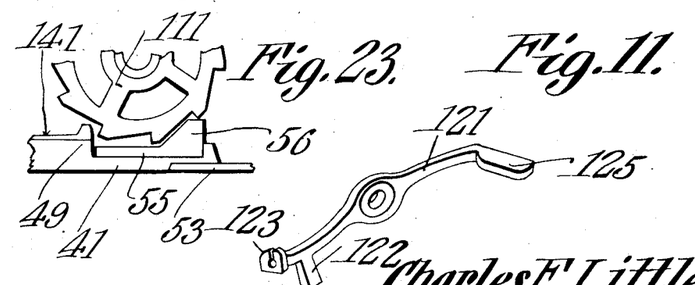
Fig. 11 is a perspective view of a pawl or lever carried by each ratchet wheel of the main registering train.
Figures 12, 24:
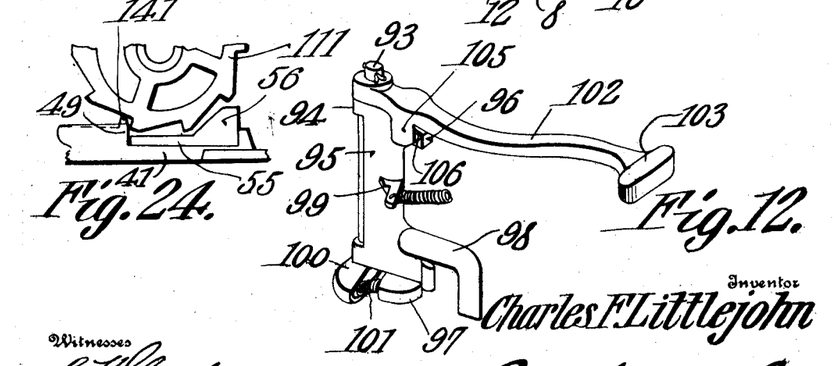
Fig. 12 is a perspective view of the signal bell operating mechanism.
Figure 16:
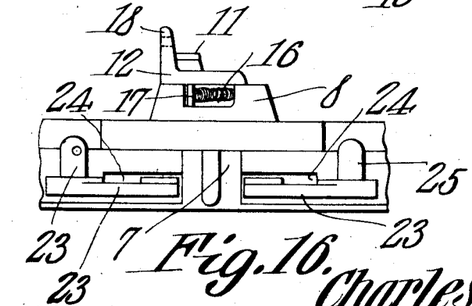
Fig. 16 is an end elevation of a portion of the supporting members of the device.
Figure 17:
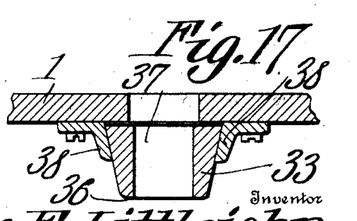
Fig. 17 is a section on the line C—D of Fig. 7.
Figure 18:
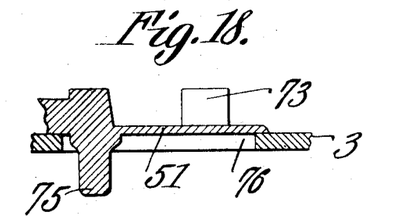
Fig. 18 is a section on the line E—F of Fig. 6.
Figure 19:
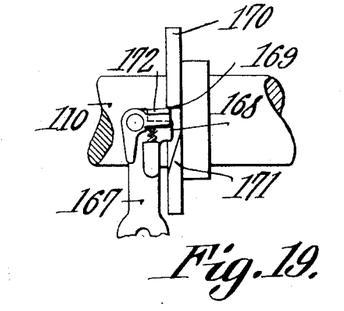
Fig. 19 is a detail view of a lock for the resetting mechanism.
Figure 20:
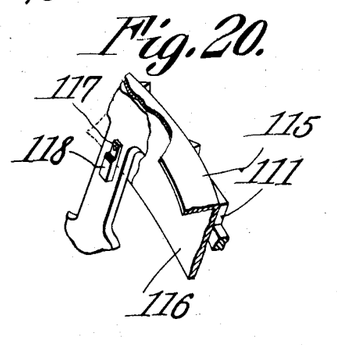
Fig. 20 is a detail perspective view of a portion of one ratchet wheel and number drum of the main registering train.
Figure 21:
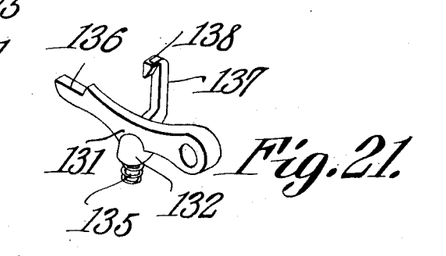
Fig. 21 is a perspective view of a back stop pawl used in the main registering train.

In the inactive position shown in Fig. 23, the ratchet wheel 111 (which may be taken as also indicative of the ratchet wheels 112 and 113) is locked against rotation in either direction by the lug 56 in the path of the teeth of the ratchet wheel. If, now, the slide 41 be moved actively the lug 56 is carried out of the path of the teeth of the ratchet wheel and the latter is rotated by the pawl 141, the extension 49 following closely the tooth engaged by the said pawl 141. The position of the parts in the first stage of this movement is shown in Fig. 24. When the active movement of the slide 41 is completed the parts considered are in the position shown in Fig. 25 with the extension 49 under-riding the ratchet wheel in such manner as to be in the path of the teeth thereof in either direction of rotation thus locking the ratchet wheel against accidental or wilful rotation.

The extensions 47, 48 and 49 move into locking engagement with the respective ratchet wheels 111, 112 and 113, when the slide 41 is moved actively whether or not one or more of these ratchet wheels be rotated by the active movement of each slide.

The main registering train is designed to register trip fares and a totalizing train is usually provided to show the sum of the trip totals. In the drawings such a totalizing train is indicated generally at 147 since its structure and arrangement may be such as is ordinarily employed for the purpose and in this instance is modified only in so far as the actuating mechanism for the totalizing train as a whole is concerned.

The totalizing train is mounted on a shaft or arbor 148 fast at the ends in the plates 107 and 108 in proper relation to the main registering train. One end of the totalizing train is provided with a ratchet wheel 149 of ordinary construction and this ratchet wheel is under the control of a pawl 150 on one end of a sliding block 151 mounted on a bracket 152 fast on the inner face of the plate 108. A back stop 153 on the end of the block 151 remote from the pawl 150 serves to lock the ratchet wheel 149 against rotation in one direction while the rotation in the other direction is prevented by a pawl 154 mounted on the plate 108. The block 151 also has an outstanding member 154' like the extensions 47, 48 and 49 of the slide 41. When the block 151 is moved actively the member 154' locks the ratchet wheel 149 in the same manner as the extensions 47, 48 and 49 lock the ratchet wheels 111, 112, and 113.

A lever 155 with rounded or ball ends is pivotally mounted on the plate 108 and one end engages the block 151 while the other end engages between the lugs 74 on the slide 41. By this means every time the slide 41 is moved actively the totalizing train is moved one step forward so that the movement of the totalizing train tallies with that of the main registering train. The bell 104 before referred to is mounted on a suitable stud carried by the plate 107 and this bell is in the path of the hammer head or striker 103.

Journaled in the plates 107 and 108 adjacent to the bar 129 is a shaft 156 carrying about midway of its length an arm 157 at the outer end of which is secured an appropriately shaped plate 158 containing suitable legends for indicating the direction of the trip of the car or any indicating display that may be desired. In the structure shown this shaft is a rock shaft having a limited movement in either direction sufficient to cause the display of one end or the other of the plate 158 as may be desired.

In order to operate the shaft 156 it is provided beyond the plate 107 with an arm 159 connected by a link 160 to crank stud 161 on a gear wheel 162 mounted on the plate 107. This gear is in mesh with a pinion 163 on the end of the shaft 110 projecting through the plate 107. The relation of the pinion 163 to the gear wheel 162 is such that on each full rotation of the shaft 110 the gear wheel 162 is given a half rotation thus rocking the shaft 156 to a corresponding extent in one direction or the other.

Fast to the shaft 110 exterior to the plate 108 is a ratchet or click wheel 164 constrained to movement in one direction only by a spring controlled pawl 165 pivoted to the plate 108.

Pivoted to an ear 166 projecting from the plate 108 is a lever 167 having one end entering in the slot 63 of the slide 55 while the other end has an angle nose 168 adapted to enter a recess 169 in a disk 170 fast on the shaft 110 at a distance from the ratchet wheel 164. One wall of the recess 169 is cam shaped as indicated at 171 so that the nose 168 of the lever 167 will tend to enter the recess 169. That end of the lever 167 provided with the nose 168 also carries a spring actuated pawl 172 movable into coincidence with the nose 168 but urged by its spring in a direction away therefrom and from the body of the lever.

When the shaft 110 is rotated in the direction permitted by the ratchet 164 and pawl 165 the nose end 168 of the lever 167 enters the recess 169 and because of the cam wall 171 the pawl 172 although normally displaced with relation to the nose 168 will also enter this recess, and ultimately the other wall of the recess will engage this pawl 172 and force it against the action of its spring into coincidence with the nose 168. Then the nose and the pawl 172 are in engagement with the wall of the recess 169 opposite the wall 171 and this nose of the lever 167 will thus operate as a stop against the further rotation of the shaft 110. If the lever 167 be moved in the proper direction then the nose 168 and the pawl 172 are withdrawn from the recess 169 and the spring of the pawl 172 acting on the latter will immediately force the said pawl away from the nose 168 so as to rest against the corresponding face of the disk 170 thus preventing the return of the lever 167 to its former position and the shaft 110 is now free to be rotated in the direction permitted by the ratchet wheel 164 and pawl 165. The outer end of the shaft 110 beyond the disk 170 is provided with a manipulating handle 173.

The several working parts of the structure are inclosed in a suitable casing 174 carried by the plate 3 and an outer face 175 is provided with openings rendering the main and totalizing numbers visible and also one or the other but not both the legends on the plate 158. Of course a suitable glass plate may be provided outside the face plate 175, but this is not shown in the drawings.

When an operator causes a movement of one or the other of the levers 22 this movement is transmitted through the corresponding link 31 to the other link 31 to the link 33 causing the movement of the head 36 in the active direction and this imparts a like movement to the frame 41 through the stud 75.

The active movement of the main frame or slide 41 actuates the main registering train in the manner already described and also imparts a like movement to the totalizing train and on the release of the actuated lever 22 the parts are returned to normal position under the action of the spring 27 which of course is powerful enough for this purpose.

On the forward or active movement of the main frame or slide 41 the lug 73 is brought into engagement with the pawl 100 and causes a movement of the block 95 about the stem 93 carrying the arm 100 therewith and the head or striker 103 is moved away from the bell 104. This movement continues until the lug 73 has passed by the pawl 100 when the block 95 is released to the action of a spring 99' which has been placed under extra tension by the movement of the block 95 under the action of the stud 73. On the release of the block 95 it is returned to normal position by the reaction of the spring 99' thus bringing the finger 98 into engagement with the lug 91 on the plate 3 and thus causing the arrest of the movement of the block 95 but the inertia of the hammer or striker 103 will carry the arm 102 against the action of the spring 101, thereby giving a hammer blow to the bell and causing a signal therefrom. This occurs just before the main slide or frame 41 has reached the limit of its active movement and this active movement must be completed before the frame may return to its normal position since until this completion of the active movement is accomplished the pawl tooth 87 restrains the frame 41 from its reverse motion.

After a trip it is desirable to return the main registering train to the zero position. The registering ratchet wheels 111 and possibly 112 and 113 have been moved each from its zero position to some other position. Now the shaft 80 is rotated by means of the manipulating member 81 in a direction to cause the frame 55 to move against the action of the spring 68 transversely of the frame 41. This movement can only take place when the parts are in the initial position for the plate 108 is formed with a shoulder 108' in the path of the lug 64 except when the parts are in the initial or normal position. The movement of the frame 55 transverse to the slide 41 carries the lugs 56 out of the path of the several ratchet wheels of the main registering train so that these wheels are no longer locked against rotation. At the same time the movement of the frame 55 has caused a movement of the lever 167 sufficient to carry its end 168 out of the recess 169 thus unlocking the shaft 110. The rotation of the shaft 110 in the direction permitted by the ratchet wheel 164 and pawl 165 will ultimately bring the notches 120 into coincidence with the fingers 122 of the pawl levers 121 of those ratchet wheels which have been rotated in the operation of the device. The engagement of the abrupt ends of the recess 120 with the corresponding lug 122 causes the ratchet wheel to participate in the rotative movement of the shaft until the end 138 of the finger 137 is reached and then the lever 121 is moved about its pivot until the lug 122 is out of the recess 120 and so the ratchet wheel is unlatched from the shaft and ceases to rotate therewith. This position of the ratchet wheel corresponds to the display of zero through the face plate 175. The rotative movement of the shaft 110 has caused a rocking of the shaft 156 to an extent to change the legends on the plate 158 to be seen through the face plate 175. The frame 55 in its laterally displaced position is locked therein by the pawl 172 on the lever 167 engaging behind the disk 170 so that when the recess 169 is reached in the rotative movement of the shaft the lever 167 is released and the frame 55 is free to return to its normal position under the action of the spring 68 and the parts are in position for operation.

It is sometimes desirable to change the position of the legend on the plate 158 to a different display than is brought about by a rotative movement of the shaft 110 in resetting the register. In order to change the display of the plate 158 it is only necessary to again move the plate 155 to the resetting position and again turn the shaft 110 in its proper direction thus causing a corresponding movement of the plate 158, but since all the ratchet wheels are now locked out of engagement with the shaft 110 they will not participate in the new movement of the shaft and the display plate 158 may be changed as desired without interference with the registering side of the device.

It will be observed that in the fare register forming the subject matter of the present invention the main registering wheels are entirely disconnected from the resetting shaft when they reach the zero position. Nor can they be made to override the zero position so as to make the register read falsely, the object being for the operator to improperly appropriate fares and report the register out of order. It will be seen that as soon as the registering wheels have reached the zero position they automatically unlock from the shaft and are at the same time locked by the return of the frame 55 to its initial position. The unlocking of the registering wheels from the resetting shaft has also the advantage, heretofore stated, of permitting the operation of the direction indicating plate independent of the registering train.

Figure 22:
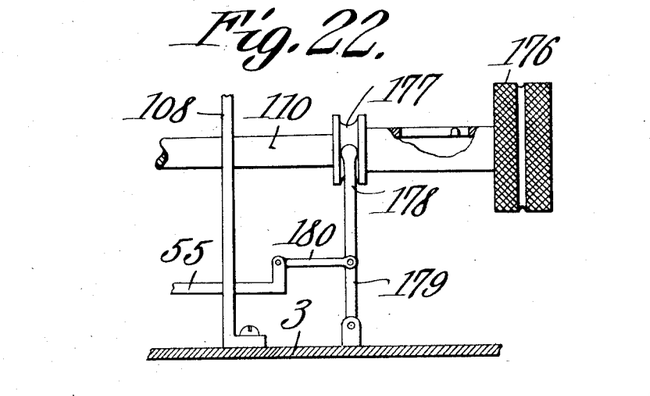
Fig. 22 is a view, more or less diagrammatic of a modification of a part of the resetting mechanism.

Instead of providing a manipulating shaft 80 for the frame 55 the accessible end of the shaft 110 may be provided with a sliding knob 176 in place of the manipulating member 173. The inner end of this knob is formed with a circumferential groove 177 receiving the forked end 178 of a lever 179 pivotally mounted at the other end on the plate 3 and connected by a link 180 to the adjacent end of the frame 55. The operation is the same as in the structure heretofore described except that instead of turning the wing 81 and shaft 80 the knob 176 is pulled outward in the direction of the longitudinal axis of the shaft 110 before the said shaft is rotated in the resetting operation. The return of the frame 55 to the initial position will cause a return of the knob 176 to its initial position.

What is claimed is:—

1. In a fare register, a means for transmitting motion to the registering mechanism comprising toggle links, a spring constrained lever, and a link extending from the lever to the junction point of the toggle links.

2. In a fare register, an operating mechanism therefor comprising two levers in opposed relation and each capable of independent movement, a sliding link having one end adapted to be connected to the mechanism to be driven and a link connection from each lever to the other end of the sliding link.

3. In a fare register, opposed levers each provided with means thereon for locking the other lever against action and a sliding member for transmitting motion from the levers to the parts to be actuated, said sliding members being connected to both levers.

4. In a fare register, two oppositely acting levers, each carrying a locking means movable therewith to lock the other lever against action, a link for actuating the registering side of the register, and link connections from each lever to the said link.

5. In a fare register, an actuating means comprising two opposed levers each having means for locking the other lever in the inactive position, a sliding link, connections between both levers and one end of the sliding link, and means for constraining the other end of the sliding link to a straight path.

6. In a fare register, opposed levers each provided with a projection movable with the lever into the path of the projection of the other lever, a sliding link having one end constrained to a straight path and link connections between the levers and the other end of the link.

7. In a fare register, a basic member and a support for the registering devices, said member and support having interlocking means at opposite points on each member, the interlocking member of the basic member carrying a spring actuated latch adapted to engage the corresponding interlocking member of the support, said latch and interlocking member on the support being provided with matching parts for the reception of a lock.

8. In a fare register provided with a registering train, a register operating means in operative relation to the registering train, and a lock for the registering mechanism carried by the register operating means and having a movement to unlocking position independent of the movement of the register operating means.

9. In a fare register, a registering train, a reciprocatory operating slide for said registering train, and provided with means for locking the registers at the extremities of the operative and return stroke movements of the slide, a back stop active to each movement of the slide, a supplementary back stop operative on the initial active movement of the slide, and exteriorly accessible means for operating the slide.

10. In a fare register, a ratchet wheel, a shaft carrying the same and provided with a recess in operative relation to the ratchet wheel, a lever carried by the ratchet wheel and provided with a tooth adapted to enter the recess in the shaft, and a back stop pawl for the ratchet wheel having a finger projecting into the path of the outer end of the lever carried by said ratchet wheel.

11. In a fare register, a ratchet wheel, a shaft on which the ratchet wheel is mounted and provided with a recess in operative relation to the ratchet wheel, a lever mounted on the ratchet wheel and provided at one end with a tooth and there constrained in a direction to carry the tooth into the recess in the shaft, said lever having the other end elongated in the direction of its movement about its pivot, and means in the path of the elongated end of the lever for moving the same in the direction opposed to its normal tendency.

12. In a fare register, a ratchet wheel having a deepened tooth and a back stop pawl for the same having an elongated nose beyond its active end for bridging the deepened tooth.

13. In a fare register, rotatable registering members, a slide for actuating the registering members, a locking means on the slide for preventing rotating movement of the registering members when the slide is in its initial position, a resetting means for the registering members, and means controlled by the resetting means for moving the locking means out of the path of the registering members prior to the action of the resetting means on said registering members.

14. In a fare register, registering means, a resetting shaft therefor, means for causing the disconnection of the registering means from the resetting shaft when in the zero position, and a direction indicating means under the constant control of the resetting shaft and movable by the latter independent of the registering means when in the zero position.

15. In a fare register, a registering means, a resetting means therefor having one direction of movement, a rockable indicating means, and direction changing connections between the resetting and indicating means in constant actuating relation to said indicating means.

16. In a fare register, a registering means, a resetting means therefor having a rotatable shaft movable in one direction, a rockable direction indicating means, and constant connections between the shaft and direction indicating means including a direction changing means for causing the alternate reversal of movement of the direction indicating means.

17. In a fare register, a main registering train, a sliding frame and means thereon for actuating the registering train, another sliding frame carried by the first named frame and provided wtih locking means for the registering train, said second frame being movable transversely to the first named frame and means for locking the second frame against movement on the first named frame except when the latter is in initial position.

18. In a fare register, a main registering train, actuating means for said train, a locking means for the registering train when its actuating means are in the initial position, a resetting mechanism for the registering train, means acting on the locking means to move it to the unlocked position prior to the action of the resetting means on the registering train.

19. In a fare register, a main registering train, a lock therefor operative to the main registering train, resetting means for the registering train, connections between the resetting means and the lock, and means for moving the lock to the unlocked position prior to the action of the resetting means.

20. In a fare register, a registering train, a lock for the same when in the inactive position said lock being constrained to the locked position and movable against said constraining means to the unlocked position, a resetting means for the registering train including a rotatable shaft, a disk on the shaft with a recess in one side having an inclined approach, and a lever provided at one end with an extension adapted to enter the notch in the disk and a latch coacting with the extension, said lever being connected at the other end of the lock for the registering means, and means for limiting the movement of the shaft to rotation in one direction.

21. In a fare register, a ratchet wheel for the main registering train provided on one side with spacing lugs and a number drum having a radially inward projection adapted to be secured to the lugs of the ratchet wheel in spaced relation to the corresponding face of the ratchet wheel.

22. In a fare register, ratchet mechanism for actuating the registering train, and a slide for actuating the registering mechanism and having means on and movable therewith into locking engagement with the ratchet mechanism on the active movement of the slide.

23. In a fare register, a main registering train including ratchet wheels, and a slide for actuating one or more of the ratchet wheels having means thereon carried into the path of the ratchet wheels on the active movement of the slide and locking said ratchet wheels against rotation in either direction.

In testimony that I claim the foregoing as my own, I have hereto affixed my signature in the presence of two witnesses.

CHARLES F. LITTLEJOHN.

Witnesses:
   EMILY A. JOHNSON,
   MARY E. BRADLEY.

---

Copies of this patent may be obtained for five cents each, by addressing the "Commissioner of Patents, Washington, D. C."